W. E. BOCK.
SPRING FRAME FOR MOTOR DRIVEN VEHICLES.
APPLICATION FILED JULY 16, 1912.

1,138,181.

Patented May 4, 1915.
3 SHEETS—SHEET 1.

WITNESSES:
W. K. Fred
James P. Barry

INVENTOR
William Emil Bock,

BY
Whittemore Hulbert & Whittemore
ATTORNEY

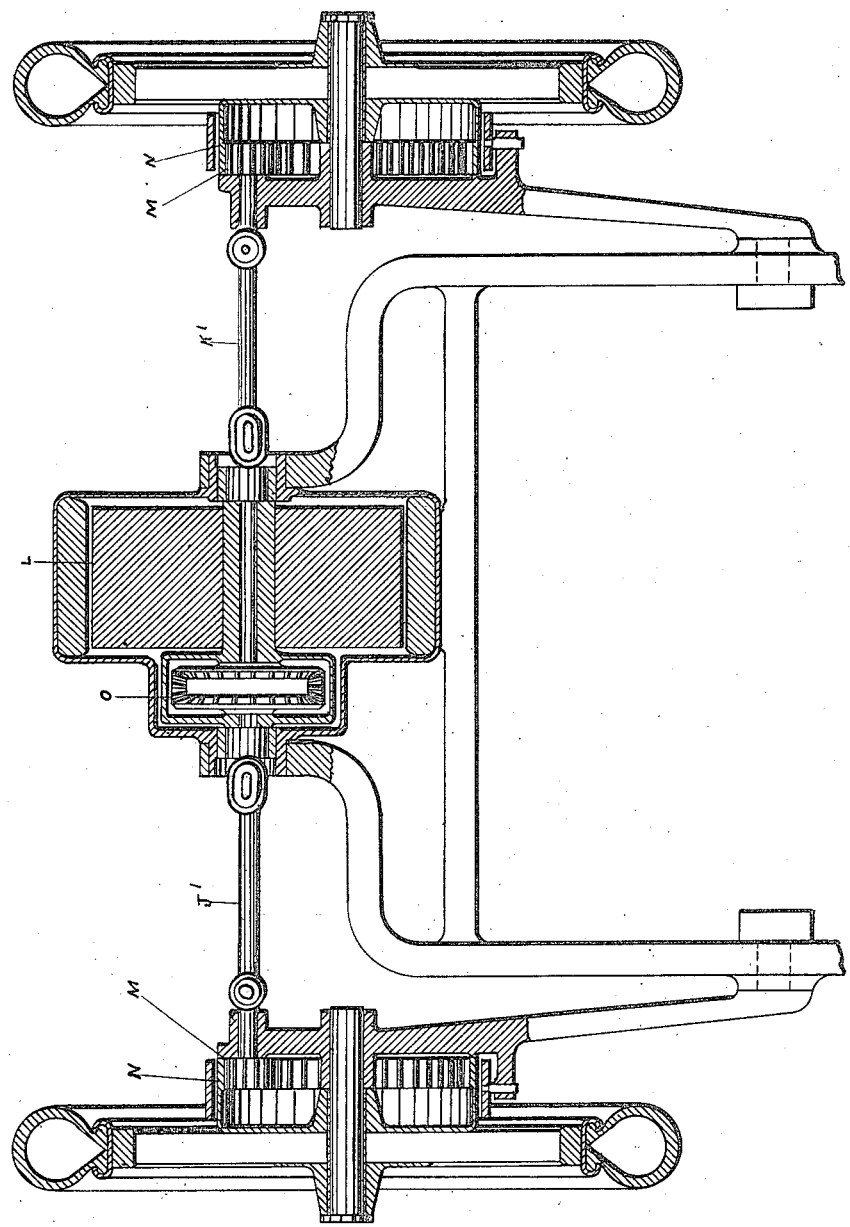

W. E. BOCK.
SPRING FRAME FOR MOTOR DRIVEN VEHICLES.
APPLICATION FILED JULY 16, 1912.

1,138,181.

Patented May 4, 1915.
3 SHEETS—SHEET 3.

WITNESSES:
W. K. Ford
James P. Barry

INVENTOR
William Emil Bock,
BY
Whittemore Hulbert & Whittemore
ATTORNEY

UNITED STATES PATENT OFFICE.

WILLIAM EMIL BOCK, OF TOLEDO, OHIO.

SPRING-FRAME FOR MOTOR-DRIVEN VEHICLES.

1,138,181.   Specification of Letters Patent.   Patented May 4, 1915.

Application filed July 16, 1912. Serial No. 709,652.

*To all whom it may concern:*

Be it known that I, WILLIAM EMIL BOCK, a citizen of the United States of America, residing at Toledo, in the county of Lucas and State of Ohio, have invented certain new and useful Improvements in Spring-Frames for Motor - Driven Vehicles, of which the following is a specification, reference being had therein to the accompanying drawings.

The invention relates to motor vehicles, and it is the object of the invention to obtain a construction of spring frame which possesses a high degree of resiliency and permits a great freedom of movement to the axles or wheels.

To this end the invention consists in the peculiar construction of a rigid frame and pivotal extensions thereof, together with longitudinally extending springs for resiliently supporting said extensions, arranged beneath the rigid frame, as hereinafter set forth.

Figure 1:
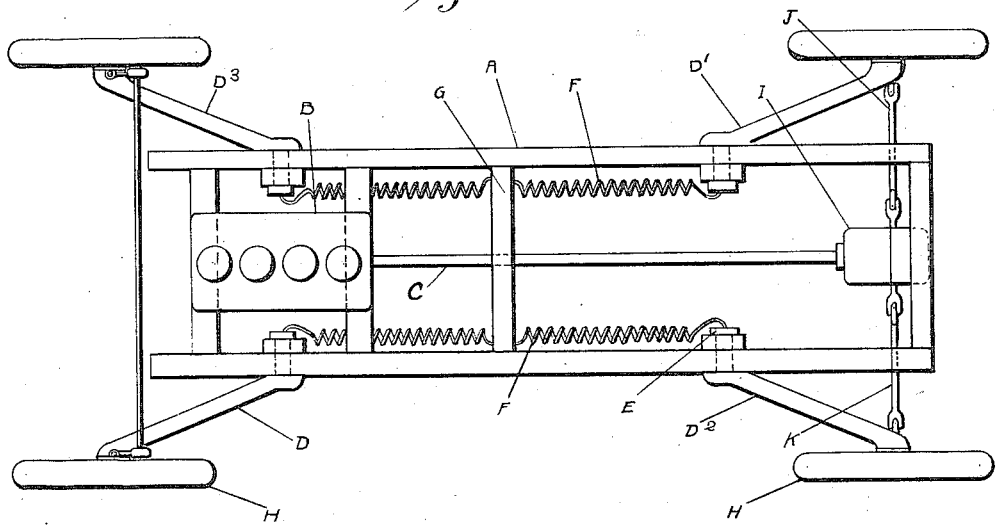
Figure 2:
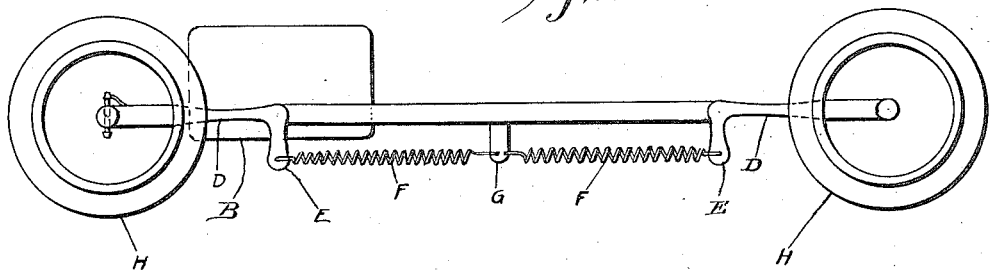
Figure 6:
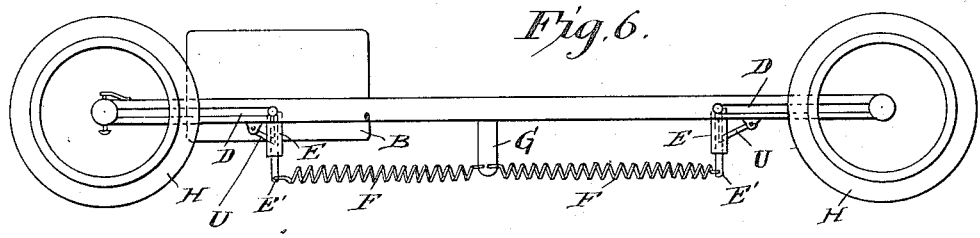
Figure 4:
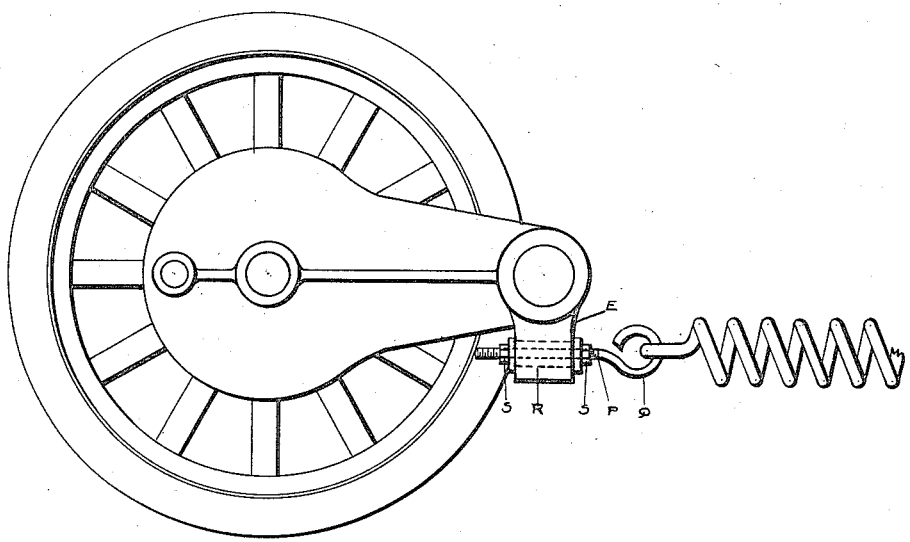
Figure 5:
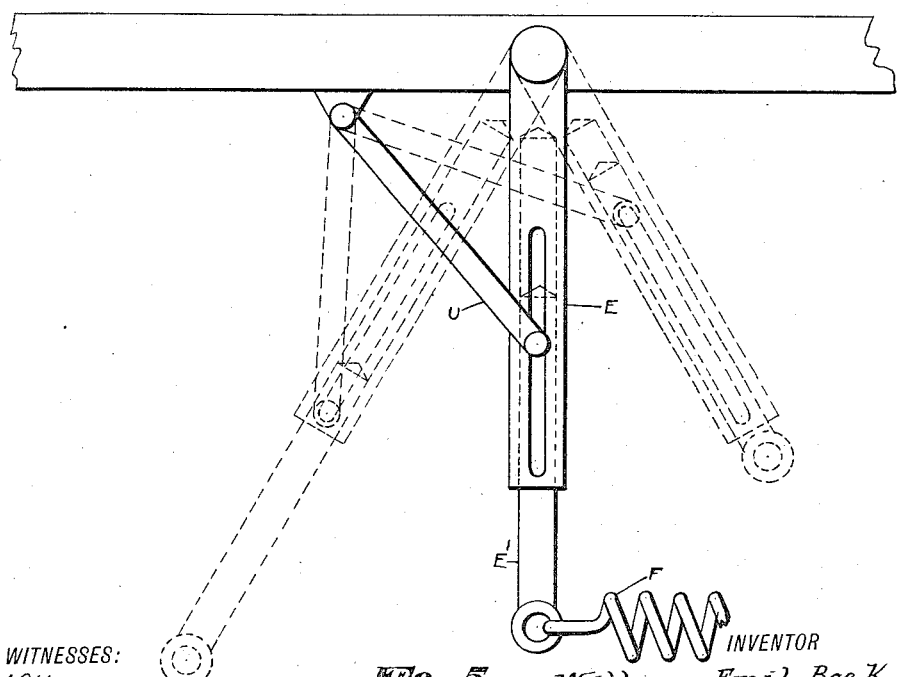

In the drawings: Figure 1 is a plan view; Fig. 2 is a side elevation; Fig. 3 is a sectional plan view showing a modified construction; Fig. 4 is an elevation of one of the wheel connecting members; Fig. 5 is a diagrammatic side elevation showing a modified construction; and Fig. 6 is a side elevation showing a modified construction.

A is a rigid chassis frame of any suitable construction, upon which is mounted the motor B, transmission shaft C, and other parts of the mechanism.

D D' $D^2$ and $D^3$ are arms pivotally connected to the frame A and independently movable in relation thereto. Each of these arms has connected thereto a depending arm E, which is connected to a longitudinally extending spring F arranged beneath the frame A, and suitably anchored as by connection with the depending bracket G. The free ends of the arms D D' $D^2$ $D^3$ are mounted upon wheels H of the vehicle, either by being connected in pairs to axles or, as shown, by being independent of each other. The drive wheels are connected to the transmission mechanism by suitable connections, which will permit of the independent movement, and, as shown in Fig. 1, the transmission shaft C is connected to a transmission gearing I, mounted on the rear portion of the rigid frame A and connected to the drive wheels through the medium of universally jointed shafts J and K. The tension of the springs F is such as to normally sustain the load carried by the vehicle, but any abnormal load or shock will cause said springs to yield, permitting the independent movement of the arms D D' $D^2$ $D^3$ and the wheels upon which they are mounted. These springs may also operate as buffers, which upon recoil will limit the movement of the arms D D' $D^2$ $D^3$, and which will hold them in their normal position.

The construction described is one which will give an easy riding vehicle, even where the wheels are provided with solid tires.

In Figs. 3 and 4 a modified construction is shown, in which an electric motor L is mounted upon the rear end of the chassis frame, and is connected to drive the wheels through the universally jointed shafts J' K' and pinions M, which are in mesh with internal gears in the brake drums N. The motor is also connected to the shafts J' K' through the medium of compensating gearing O, the detail construction of which however forms no part of the present invention.

With my improved construction the vehicle is capable of adjustment to tension the springs in proportion to the load to be carried. The change of tension may be effected by elongating the springs to increase the tension thereof, or by shifting their point of attachment to the arms E so as to increase or decrease their leverage thereon.

As shown in Fig. 4, P is a threaded shank having a threaded eye Q for attachment to the spring F, said shank passing through a slot R in the bell-crank arm E. S are clamping nuts upon opposite sides of the arm E for securing the shank P thereto. The arrangement is such that by loosening the nuts the shank may be adjusted in position upon the arm E, or by adjusting the nuts the tension on the spring F may be altered.

In Fig. 5 an automatic means of adjusting the tension of the springs is shown, which is particularly designed to avoid sidewise tilting of the frame under unequal loads or shocks. This comprises a sliding or telescopic extension E' of the arm E to which the spring F is attached. U is a pivotal link connected at one end to the extension E' and at its opposite end to the frame. This link is so arranged that when the arm D is deflected the movement of the arm E will cause the link U to adjust the extension E' outward so as to increase the leverage upon the spring F. On the other hand when there is an opposite movement of the arms D and E the link U will draw the extension E' forward shortening the leverage upon the spring. The effect of this construction is to automatically counteract any tendency of the vehicle frame to tilt, as the depression of one will increase the tension of the springs resisting such depression, and the rising of one side will automatically decrease the tension of the springs operating thereon.

What I claim as my invention is:

1. A motor vehicle comprising a rigid frame, independent extensions for each of the ground-wheels pivotally connected to said frame, downwardly-extending bell-crank arms for said extensions, and springs arranged beneath said frame and anchored thereto, connected respectively to said bell-crank arms and resiliently supporting said extensions, said bell-crank arms having a telescopic extension to which said springs are anchored and a pivotal link connected at one end to the extension of said bell-crank lever and at its opposite end to the frame.

2. A motor vehicle comprising a rigid frame, independent extensions for each of the ground-wheels pivotally connected to said frame, downwardly-extending bell-crank arms for said extensions, said bell-crank arms having a telescopic extension, springs arranged beneath said rigid frame and anchored thereto, connected respectively to the telescopic extensions of said bell-crank arms and resiliently supporting said extensions, and a pivotal link connected at one end to the telescopic extension of the bell-crank arm and at its opposite end to the frame.

In testimony whereof I affix my signature in presence of two witnesses.

WILLIAM EMIL BOCK.

Witnesses:
    Frank H. Geer,
    R. W. Kirkley.